US012106920B2

(12) United States Patent
Chiu et al.

(10) Patent No.: US 12,106,920 B2
(45) Date of Patent: Oct. 1, 2024

(54) LIGHTWEIGHT INDUSTRIAL FUSE

(71) Applicant: CONQUER ELECTRONICS CO.,LTD., New Taipei (TW)

(72) Inventors: Hung-Chih Chiu, New Taipei (TW); Po-Shuo Chiu, New Taipei (TW)

(73) Assignee: CONQUER ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/993,318

(22) Filed: Nov. 23, 2022

(65) Prior Publication Data

US 2024/0112875 A1 Apr. 4, 2024

(30) Foreign Application Priority Data

Sep. 30, 2022 (TW) ................................ 111137426

(51) Int. Cl.
*H01H 85/17* (2006.01)
*H01H 85/041* (2006.01)
(Continued)

(52) U.S. Cl.
CPC ...... *H01H 85/0417* (2013.01); *H01H 85/143* (2013.01); *H01H 85/17* (2013.01); *H01H 85/1755* (2013.01)

(58) Field of Classification Search
CPC ........ H01H 2085/0412–0414; H01H 85/0417; H01H 85/143; H01H 85/165–1755; H01H 2085/383
See application file for complete search history.

(56) References Cited

U.S. PATENT DOCUMENTS 5,153,553 A * 10/1992 Ruehl ................ H01H 85/1755 337/273
5,357,234 A * 10/1994 Pimpis ................ H01H 85/165 337/252
(Continued)

FOREIGN PATENT DOCUMENTS

CN 104137217 A 11/2014
CN 208873696 U 5/2019
(Continued)

OTHER PUBLICATIONS

TW Search Report of Patent Application No. 111137426, Sep. 30, 2022, 2 pages.
(Continued)

*Primary Examiner* — Jacob R Crum
(74) *Attorney, Agent, or Firm* — Muncy, Geissler, Olds & Lowe, P.C.

(57) ABSTRACT

A lightweight industrial fuse has a housing and a conductive fuse. The housing has a first plastic half-housing and a second half-housing combined with each other. The conductive fuse is integrally formed and clamped between the first and second half-housing. The conductive fuse has a fusible body and two intermediary portions disposed within the housing, and two electrode portions exposed from two opposite ends of the housing. Thus, an enclosed accommodation cavity of the housing is defined through the combination of the first and second half-housing. A manufacturing process is simplified, and a manufacturing cost is decreased, and further a weight of the industrial fuse is effectively reduced.

16 Claims, 12 Drawing Sheets

(51) Int. Cl.

| | |
|---|---|
| ***H01H 85/143*** | (2006.01) |
| *H01H 85/175* | (2006.01) |

(56) References Cited

U.S. PATENT DOCUMENTS

| | | | | |
|---|---|---|---|---|
| 2006/0012934 | A1 | 1/2006 | Faulkner | |
| 2012/0133478 | A1* | 5/2012 | Chiu .................... | H01H 85/165 337/228 |
| 2018/0114663 | A1* | 4/2018 | Pössnicker ......... | H01H 85/0418 |
| 2018/0138004 | A1* | 5/2018 | Schlaak ............. | H01H 85/0082 |
| 2022/0328272 | A1* | 10/2022 | Hetzmannseder ..... | H01H 85/43 |

FOREIGN PATENT DOCUMENTS

| | | | |
|---|---|---|---|
| CN | 110047718 | A | 7/2019 |
| CN | 110911254 | A | 3/2020 |
| CN | 112863969 | A | 5/2021 |
| TW | M640027 | U | 4/2023 |
| WO | WO2016/199656 | A1 | 12/2016 |

OTHER PUBLICATIONS

Examination Report of the JP patent application No. 2022-205026 and its English translation.

* cited by examiner

LIGHTWEIGHT INDUSTRIAL FUSE

CROSS-REFERENCE TO RELATED APPLICATIONS

This application is based upon and claims priority under 35 U.S.C. 119 from Taiwan Patent Application No. 111137426 filed on Sep. 30, 2022, which is hereby specifically incorporated herein by this reference thereto.

BACKGROUND OF THE INVENTION

1. Field of the Invention

The present invention is related to a fuse, especially to a lightweight industrial fuse.

2. Description of the Prior Arts

An industrial fuse is a protection element for a power apparatus or equipment to protect circuits or electrical devices mounted in the power apparatus or equipment. With reference to FIGS. 11A and 11B, a conventional industrial fuse in accordance with the prior arts includes an insulating cylinder 4, two metal caps 5, and a conductive fuse 6. The insulating cylinder 4 is hollow, made of a ceramic material, and has two end openings. Each metal cap 5 is mounted around the corresponding end openings of the insulating cylinder 4 and includes an electrode 51. Each electrode 51 has a hole 52 formed therethrough for a screw (not shown) disposed through to be fastened on the corresponding circuit board (not shown). The conductive fuse 6 is disposed through the insulating cylinder 4 and has two ends. The ends of the conductive fuse 6 are respectively welded to an inner surface of the metal caps 5.

The conventional industrial fuse has to use the metal caps 5 mounted around the insulating cylinder 4 for welding the conductive fuse 6 disposed through the insulating cylinder 4. Therefore, a manufacturing process of the conventional industrial fuse is complicated. The manufacturing process is not conducive to being simplified and a production cost is also not conducive to being reduced. Furthermore, because the insulating cylinder 4 is made of a ceramic material and the metal caps 5 are made of metal, the conventional industrial fuse is heavy and is not conducive to being used by a lightweight power apparatus or equipment. Therefore, the conventional industrial fuse needs to be improved

SUMMARY OF THE INVENTION

An objective of the present invention is to provide a lightweight industrial fuse.

To achieve the objection mentioned above, the lightweight industrial fuse includes:

- a housing having:
  - a first plastic half-housing; and
  - a second plastic half-housing combined with the first plastic housing to define an enclosed accommodation cavity; and
- at least one sheet conductive fuse clamped between the first and second plastic half-housing, and each of the at least one sheet conductive fuse having a fusible body, two intermediary portions, and two electrode portions formed integrally, wherein
  - the fusible body is disposed in the enclosed accommodation cavity;

- the intermediary portions are respectively connected to two opposite ends of the fusible body; and
  - the electrode portions are respectively connected to two ends of the intermediary portions far from the fusible body and respectively expose from two opposite sides of the housing.

With the foregoing description, the main technical feature of the lightweight industrial fuse in accordance with the present invention is that through the combination of the first and second plastic half-housing to form the housing having the enclosed accommodation cavity. The conductive fuse is directly clamped between the first and second plastic half-housing, and the electrode portions of the conductive fuse are exposed from the opposite sides of the housing. A manufacturing process of the lightweight industrial fuse in accordance with the present invention is simplified, and a production cost is substantially reduced. Furthermore, the lightweight industrial fuse in accordance with the present invention is substantially lightened through the housing made of plastic and is used by a lightweight power apparatus or equipment.

DETAILED DESCRIPTION OF THE EMBODIMENTS

With multiple embodiments and drawings thereof, the features of the present invention are described in detail as follows.

Figure 1A:
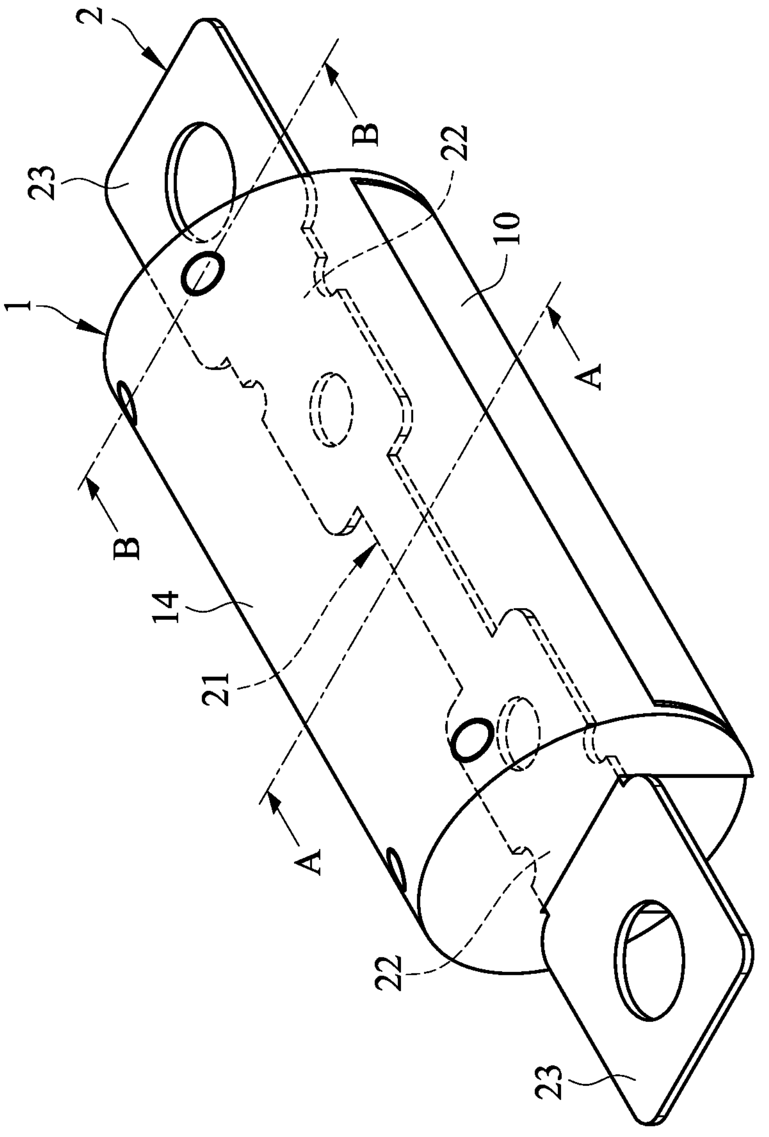
FIG. 1A is a perspective view of a first embodiment of a lightweight industrial fuse in accordance with the present invention.
Figure 2:
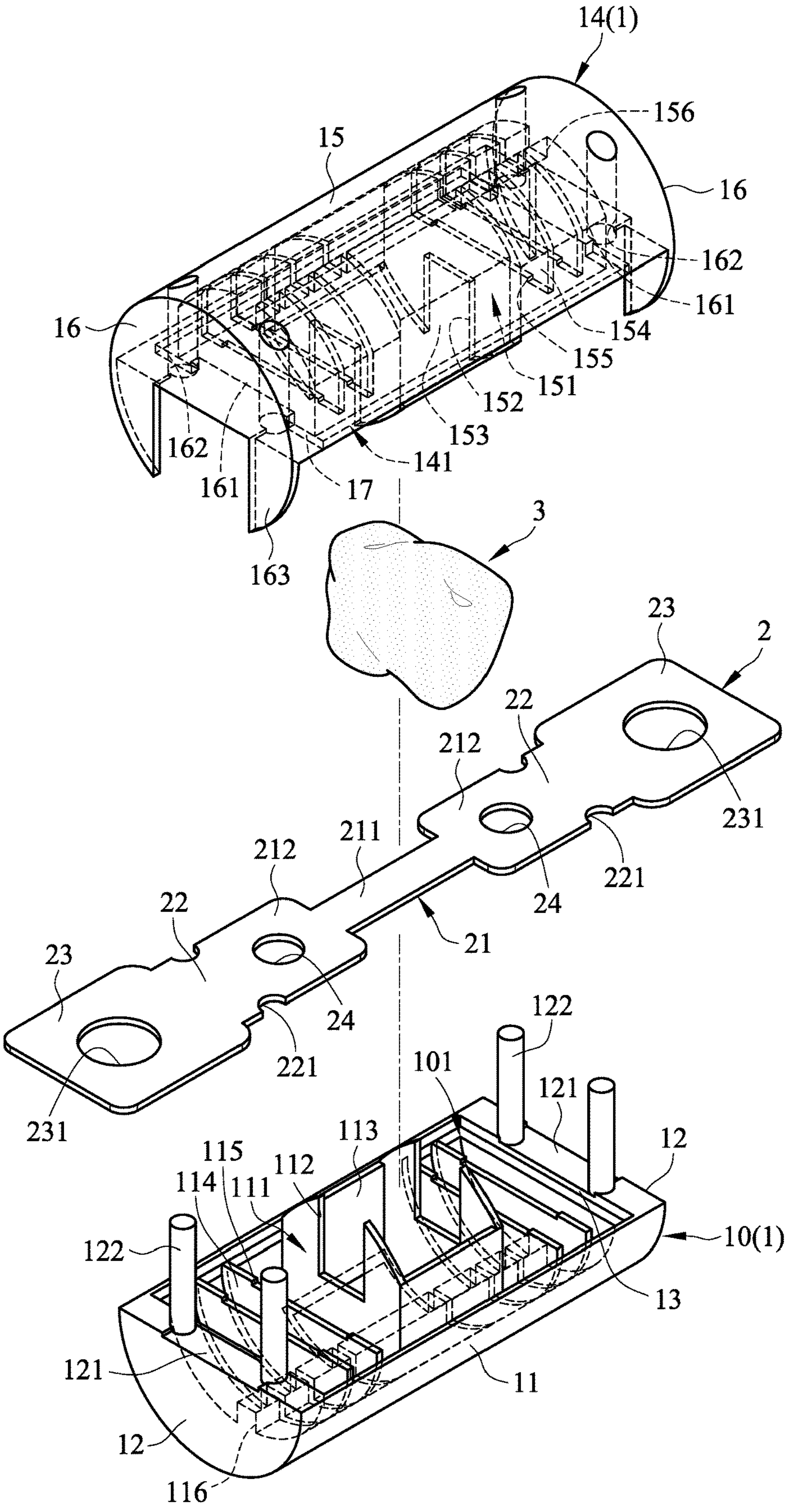
FIG. 2 is an exploded perspective view of the lightweight industrial fuse in FIG. 1A.

With reference to FIGS. 1A and 2, a first embodiment of a lightweight industrial fuse in accordance with the present comprises a housing 1 and at least one sheet conductive fuse 2, and may further comprise an explosion-proof material 3.

Figure 1B:
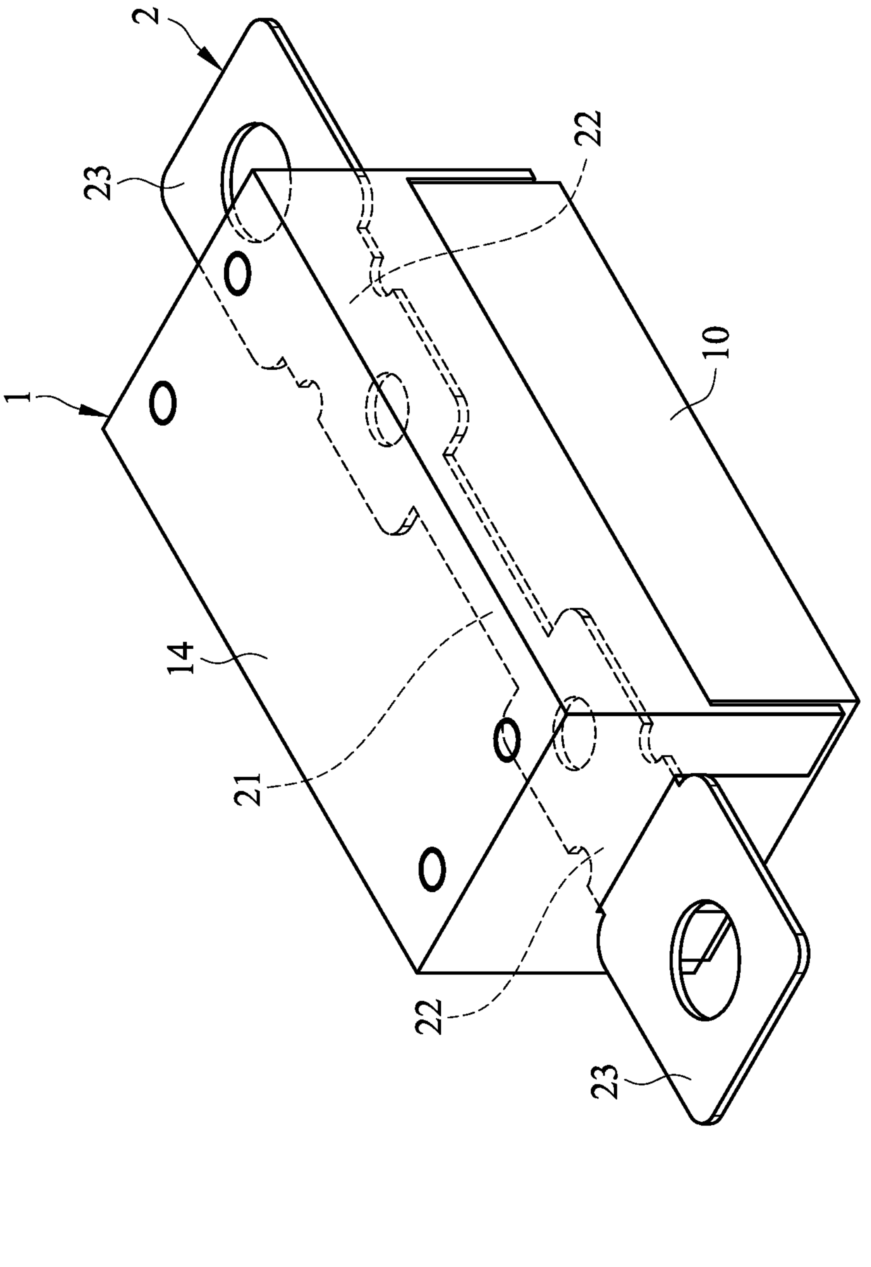
FIG. 1B is a perspective view of a second embodiment of a lightweight industrial fuse in accordance with the present invention.
Figure 3:
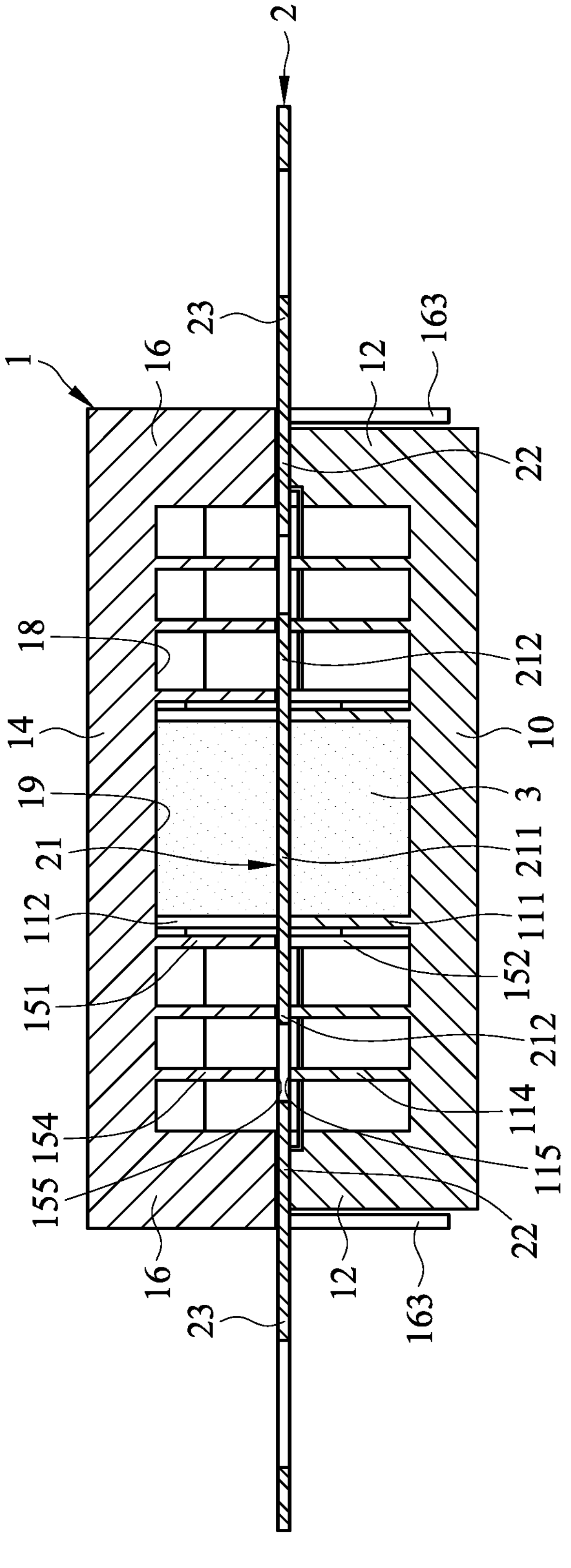
FIG. 3 is a side view in partial section of the lightweight industrial fuse in FIG. 1A.

With reference to FIGS. 1A and 3, the housing 1 comprises a first plastic half-housing 10 and a second plastic half-housing 14 to define an enclosed accommodation cavity 18. In this embodiment, the first plastic half-housing 10 and the second half-housing 14 are half-hollow cylinders. The first plastic half-housing 10 and the second half-housing 14 are combined to form the housing 1 being a hollow cylinder. In another embodiment as shown in FIG. 1B, the first plastic half-housing 10 and the second half-housing 14 are half-hollow cuboids. The first plastic half-housing 10 and the second plastic half-housing 14 are combined to form the housing 1 which is a hollow cuboid. However, the shape of the housing 1 as described is not limited to a cylinder or a cuboid.

With reference to FIG. 2, the first plastic half-housing 10 of the housing 1 includes a first half shell 11 and two first sidewalls 12 formed integrally, and a first opening 101. In the present embodiment, a shape of the first half shell 11 is half-tubular and a shape of the first sidewall 12 is half-circular. An annular groove 13 is formed on an inner periphery of the first opening 101.

With reference to FIGS. 2 and 3, in one embodiment, the first half shell 11 includes two first engaging plates 111, a plurality of first transverse ribs 114, a first longitudinal rib 116, and two first connecting plates 113. The first engaging plates 111 are integrally formed on a middle section of an inner surface of the first half shell 11 and are parallel with the first sidewalls 12. A top end of each first engaging plate 111 extends out of the first opening 101 of the first plastic half-housing 10. Each first engaging plate 111 has a first engaging indentation 112 formed downward from a top surface of the corresponding first engaging plate 111. The first connecting plates 113 are integrally formed on the middle section of the inner surface of the first half shell 11, are separated from each other to respectively and integrally connect to two opposite sides of the first engaging plates 111, are parallel with two opposite sides of the first opening 101, and are spaced a distance from the sides of the first opening 101. The first transverse ribs 114 are integrally formed on the inner surface of the first half shell 11, are respectively located outside of the first engaging plates 111, and are parallel with the first sidewalls 12. Each first transverse rib 114 has a first notch 115 formed thereon. A bottom surface of each first notch 115 is flush with a bottom surface of the first engaging indentation 112 of each first engaging plate 111. The first longitudinal rib 116 is integrally formed on the inner surface of the first half shell 11, protrudes through the first engaging plates 111 and the first transverse plates 114, and connects to the first sidewalls 12.

In one embodiment, each first sidewall 12 includes a first recess 121 and at least one fixing post 122. Each first recess 121 is formed on a plane of the corresponding first sidewall 12. A bottom surface of each first recess 121 is flush with the bottom surface of each first notch 115 and the bottom surface of each first engaging indentation 112. In one embodiment, two fixing posts 122 are integrally formed on the plane of each first sidewall 12. The fixing posts 122 are respectively located at two opposite sides of the corresponding first recess 121. In the present embodiment, each fixing post 122 is higher than the first engaging plates 111 and is a cylinder, but the amount and the shape of the fixing post 122 are not limited thereto.

Figure 4:
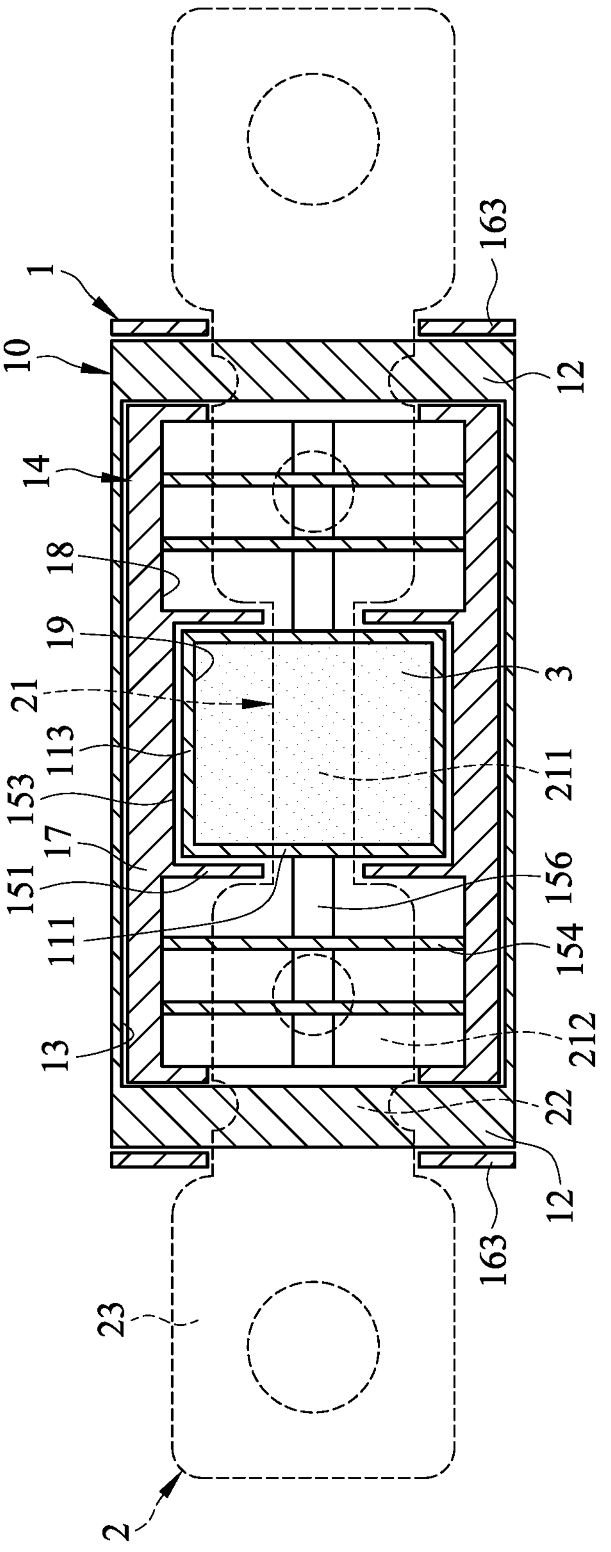
FIG. 4 is a top view in partial section of the lightweight industrial fuse in FIG. 1A.

With reference to FIG. 2, the second plastic half-housing 14 of the housing 1 includes a second half shell 15 and two second sidewalls 16 formed integrally, and a second opening 141. In the present embodiment, a shape of the second half shell 15 is half-tubular and a shape of the second sidewall 16 is half-circular. Two opposite engaging flanges 17 are formed on an inner periphery of the second opening 141 and further extend downward. The engaging flanges 17 correspond to the annular groove 13 of the first plastic half-housing 10. A height of the engaging flanges 17 matches a depth of the annular groove 13. A shape of each engaging flange 17 is an elongated U-shape. As shown in FIGS. 2 and 4, the engaging flanges 17 are respectively spaced a distance from the second sidewalls 12 to respectively correspond to the first recesses 121 of the first sidewalls 12.

With reference to FIGS. 2 and 4, in one embodiment, the second half shell 15 includes two second engaging plates 151, a plurality of second transverse ribs 154, a second longitudinal rib 156, and two second connecting plates 153. The second engaging plates 151 are integrally formed on a middle section of an inner surface of the second half shell 15 corresponding to the first engaging plates 111 and are parallel with the second sidewalls 12. A top end of each first engaging plates 111 extends out of the second opening 141 of the second plastic half-housing 14. Each second engaging plate 151 has a second engaging indentation 152 formed upward from a bottom surface of the corresponding second engaging plate 151. The second connecting plates 153 are separated from each other to respectively and integrally connect to two opposite sides of the second engaging plates 151. The second connecting plates 153 are respectively and integrally formed with two opposite sides of the second opening 141 to respectively and integrally connect to two opposite sides of the second engaging plates 151. In the present embodiment, as shown in FIG. 4, the second connecting plates 153 are respectively and integrally formed with the engaging flanges 17. The second transverse ribs 154 are integrally formed on the inner surface of the second half shell 11, are respectively located outside of the second engaging plates 151, and are parallel with the second sidewalls 16. Each second transverse rib 154 has a second notch 155 formed thereon. A top surface of each second notch 155 is flush with a top surface of the second engaging indentation 152 of each second engaging plate 151. The second longitudinal rib 156 is integrally formed on the inner surface of the second half shell 15, protrudes through the second engaging plates 151 and the second transverse plates 154, and connects to the second sidewalls 16.

In one embodiment, each second sidewall 16 includes a second recess 161, at least one fixing hole 162, and two matching portions 163. Each second recess 161 is formed on a plane of the corresponding second sidewall 16 corresponding to the first recess 121 of each first sidewall 12. A top surface of each second recess 161 is flush with a top surface of each second notch 155 and a top surface of each second engaging indentation 152. In one embodiment, two fixing holes 162 are formed through the plane of each second sidewall 16 corresponding to the two fixing posts 122 of each first sidewall 12. The fixing hole 162 is for the corresponding fixing post 122 disposed through. In the present embodiment, a shape of each fixing hole 162 is circular for the corresponding fixing post 122 inserting in, but the amount and the shape of the fixing holes 162 are not limited thereto. The matching portions 163 are integrally formed on the plane of the corresponding second sidewall 16 and are respectively disposed outside of the first sidewalls 12. That is, as shown in FIG. 3, a distance between the matching portions 163 of the second sidewalls 16 matches a length of the first plastic half-housing 10.

Figure 5:
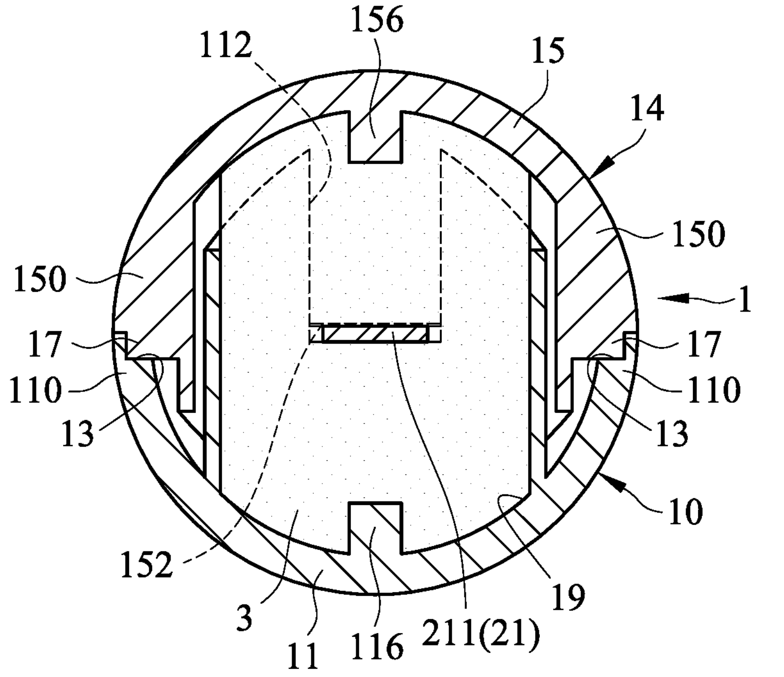
FIG. 5 is a cross-sectional view along the A-A line in FIG. 1A.
Figure 6:
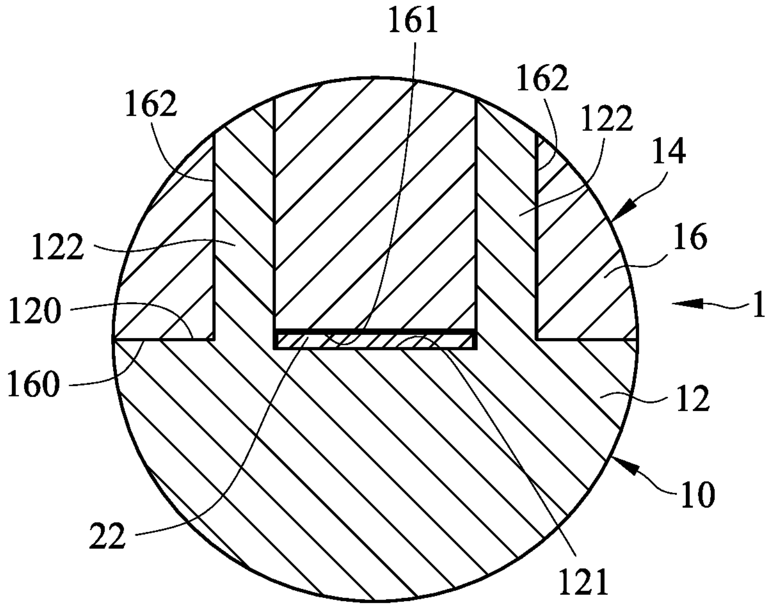
FIG. 6 is a cross-sectional view along the B-B line in FIG. 1A.

In the present embodiment, the fixing posts 122 of the first sidewalls 12 are respectively disposed through the fixing hole 162 of the second sidewalls 16. An end of each fixing post 122 is welded to the corresponding fixing hole 162 to stabilize the combination of the first plastic half-housing 10 and the second plastic half-housing 14 and to form the housing 1. As shown in FIGS. 2, 5, and 6, the engaging flanges 17 of the second half shell 15 are engaged with and attached to the annular groove 13 of the first half shell 11. Then, the first opening 101 and the second opening 141 cover each other to define the enclosed accommodation cavity 18 through the combination of the first plastic half-housing 10 and the second plastic half-housing 14. In one embodiment, the second engaging plates 151 are disposed outside of the first engaging plates 111 to define a fusing cavity 19. In the present embodiment as shown in FIGS. 3 and 4, the second engaging plates 151 and the second connecting plates 153 are disposed outside of the first engaging plates 111 and the first connecting plates 113. A part of each first transverse rib 154 is attached to the corresponding first transverse rib 114. The matching portions 163 limit a movement of the first plastic half-housing 10, so that a left and a right movement of an end of each first sidewalls 12 are limited by the matching portions 163.

With reference to the FIGS. 1A and 3, the at least one sheet conductive fuse 2 is clamped between the first plastic half-housing 10 and the second plastic half-housing 14. In the present embodiment, the amount of the at least one sheet conductive fuse 2 is one. The sheet conductive fuse 2 includes a fusible body 21, two intermediary portions 22, and two electrode portions 23 formed integrally. The fusible body 21 is disposed in the enclosed accommodation cavity 18 of the housing 1, and a part of the fusible body 21 is accommodated in the fusing cavity 19. The intermediary portions 22 are respectively connected to two opposite ends of the fusible body 21. The electrode portions 23 are respectively connected to two ends of the intermediary portions 22 far away from the fusible body 21 and are exposed from two opposite sides of the housing 1.

Figure 7A:
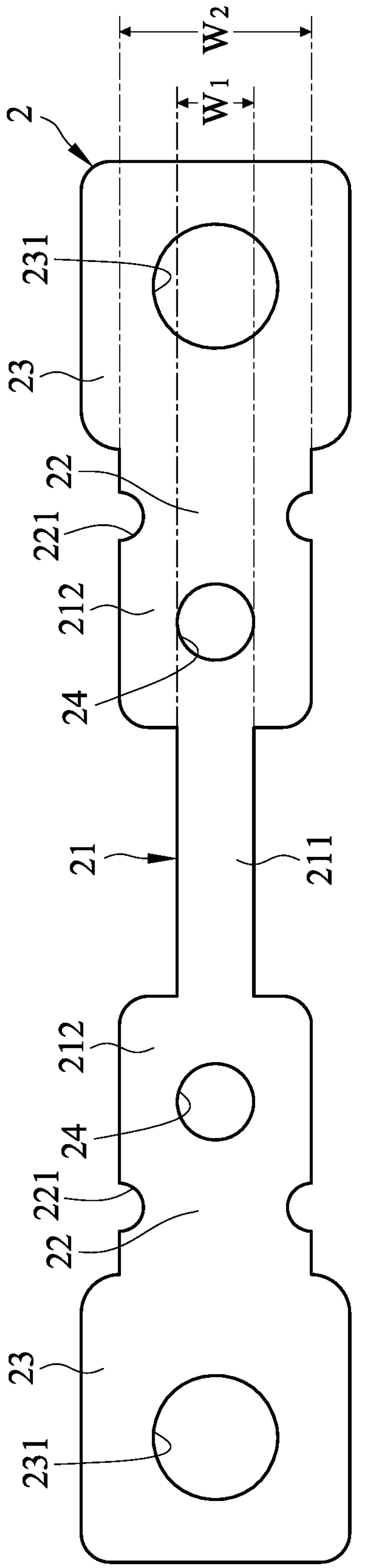
FIG. 7A is a top view of a first embodiment of a conductive fuse of a lightweight industrial fuse in accordance with the present invention.
Figure 7B:
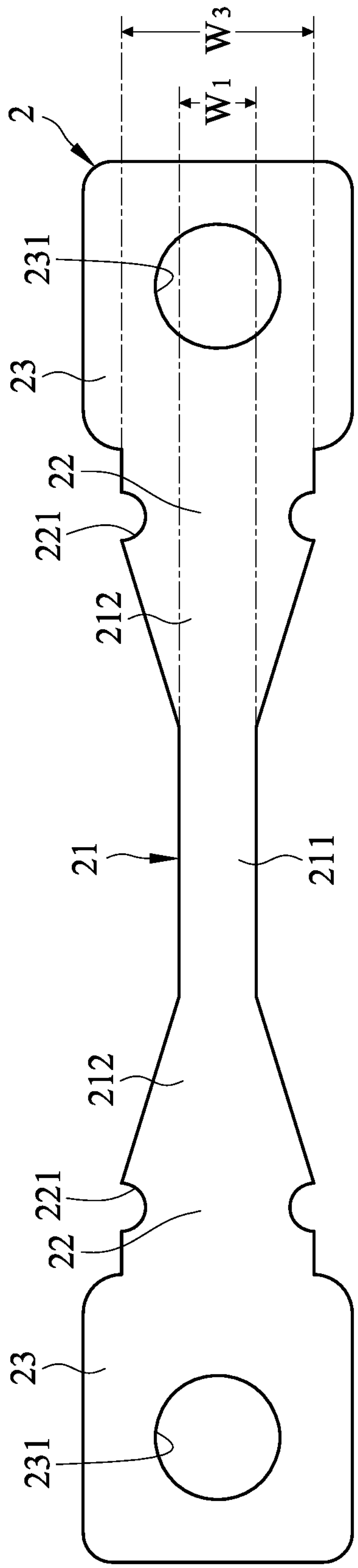
FIG. 7B is a top view of a second embodiment of a conductive fuse of a lightweight industrial fuse in accordance with the present invention.

In the present embodiment, as shown in FIGS. 7A and 7B, the fusible body 21 further includes a first segment 211 and two second segments 212 respectively facing toward the intermediary portions 22. The first segment 211 has a linear shape, and as shown in FIG. 7A, a width W2 of each second segment 212 and each intermediary portion 22 is larger than a width $W_1$ of the first segment 211. In one embodiment, as shown in FIG. 7B, a width of the intermediary portions matches a maximum width $W_3$ of each second segment 212, and the width $W_3$ is larger than the width $W_1$ of the first segment 211. A minimum width of each second segment 212 matches the width $W_1$ of the first segment 211. In the present embodiment as shown in FIGS. 2 and 7A, a gap 24 is formed through each second segment 212, so that the distance between both ends of the fusible body 21 is lengthened by the gaps 24 after the fusible body 21 being fused to reduce the possibility to generate the electric arc. As shown in FIGS. 3 and 4, the first segment 211 of the fusible body 21 is clamped between the first engaging plates 111 and the second engaging plates 151, is located at the fusing cavity 19, and is engaged with the first engaging indentations 112 and the second engaging indentations 152. The second segments 212 are respectively clamped between the corresponding first transverse ribs 114 and second transverse ribs 154, are located at the enclosed accommodation cavity 18, and are respectively engaged with the corresponding first notches 115 and the second notch 155.

In one embodiment, at least one notch 221 is formed on each intermediary portion 22 corresponding to and engaged with the at least one fixing post 122. In the present embodiment, two notches 221 are respectively formed on each intermediary portion 22 corresponding to the two fixing posts 122 to be engaged with and be mounted between the fixing posts 122, but the amount of the notch 221 is not limited thereto. In the present embodiment, as shown in FIG. 6, the intermediary portions 22 may be respectively clamped between the first sidewalls 12 and the second sidewalls 16 and be respectively engaged with the first recesses 121 of the first sidewalls 12 and the second recesses 161 of the second sidewalls 16.

As shown in FIGS. 2, 7A, and 7B, a hole 231 is formed through each electrode portion 23 for a screw (not shown) protruding through and fastening on the corresponding circuit board (not shown).

In the present embodiment, the explosion-proof material 3 is filled in the fusing cavity 19. The explosion-proof material 3 may be made of a ceramic sand, a quartz sand, or a glass fiber. As shown in FIGS. 3 and 5, the explosion-proof material 3 may be fully filled in the fusing cavity 19 to embed the first segment 211 therein. When the fusible body 21 encounters exceeding current and starts melting by the massive heat, the explosion-proof material 3 keeps the flame from generating by the fusible body 21.

With the foregoing description, the first plastic half-housing 10 is combined with the second plastic half-housing 14 to form the housing 1. The combination between the first and second half shells 11 and 15 and the first and second sidewalls 12 and 16 are convenient. The engagement between the annular groove 13 and the engaging flange 17 is also convenient. Therefore, the manufacturing process of the lightweight industrial fuse is simplified, and the production cost is also reduced. Further, the enclosed accommodation cavity 18 of the housing 1 is directly defined by the combination of the first and second plastic half housing 10 and 14. A weight of the lightweight industrial fuse can be effectively reduced. Furthermore, the second engaging plates 151 are respectively located outside the first engaging plates 111 after the housing 1 formed. The first and second engaging plates 111 and 151 form an explosion-proof structure in three layers with the first and second plastic half-housing 10 and 14. When the fusible body 21 of the sheet conductive fuse 2 encounters exceeding current and starts melting by the massive heat, the explosion-proof structure absorbs a shock of an arc gas and a blast generated by the fusion of the fusible body 21. Thus, the explosion-proof structure keeps the danger from explosion of the housing 1 made of the plastic. The explosion-proof material 3 may be further filled in the fusing cavity 19 to keep the burning generated when the fusible body 21 of the at least one conductive fuse 2. The first and second transverse ribs 114, 154 and the first and second longitudinal ribs 116 and 156 formed on the corresponding first and second plastic half-housing 10 and 14 strengthen the structural strength of the housing 1 formed by combining the first and second plastic half-housing 10 and 14. Similarly, the fixing posts 122 of the first plastic half-housing 10 are welded to the corresponding fixing hole 162 of the second plastic half-housing 14, and the structural strength of the housing 1 is further strengthened. Moreover, the matching portions 163 is further formed on the second plastic half-housing 14. The first and second plastic half-housings 10 and 14 will not be skewed when assembling. Thus, an assembly process of the lightweight industrial fuse is simplified. Therefore, the housing 1 is not only made of the plastic material to reduce the weight of the lightweight industrial fuse, but the structural strength is further strengthened. A safety and a reliability of the lightweight industrial fuse when using is improved.

Figure 8:
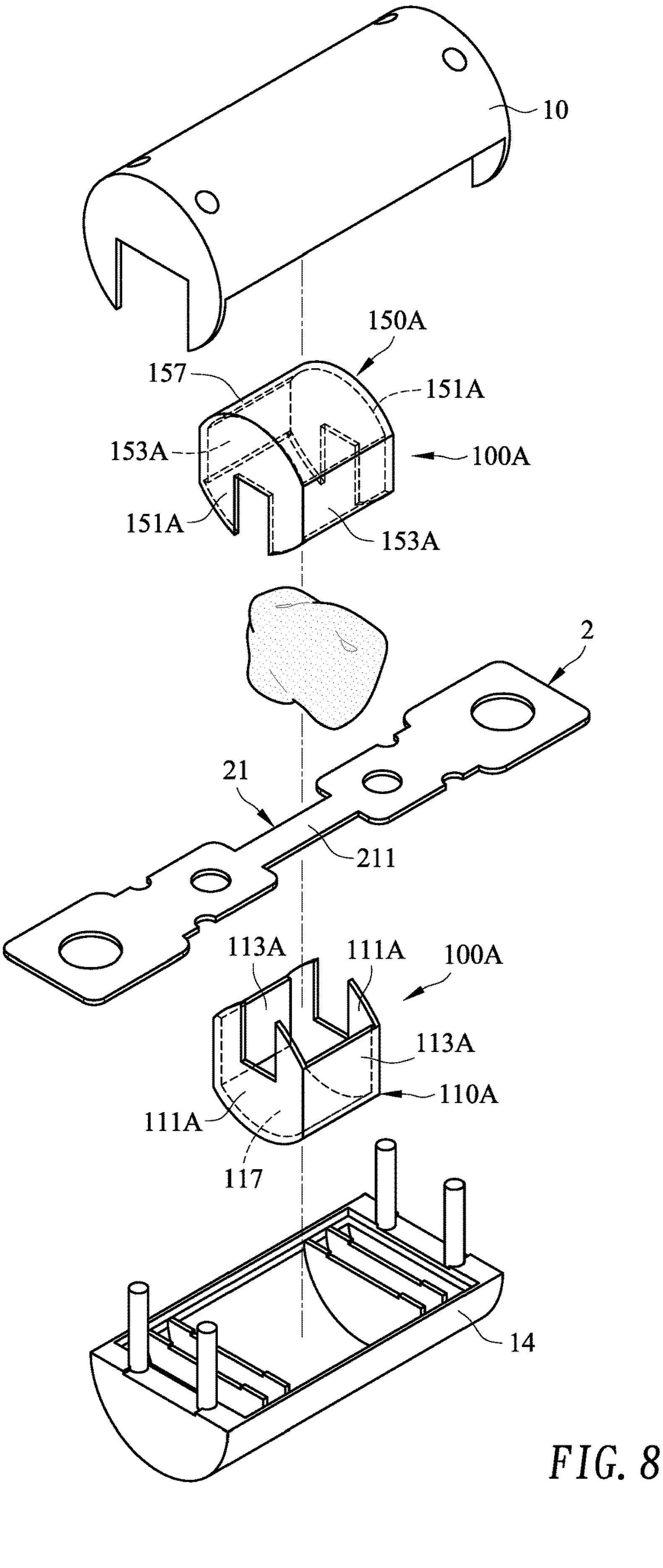
FIG. 8 is an exploded perspective view of a third embodiment of a lightweight industrial fuse in accordance with the present invention.

Further, as shown in FIG. 8, in another embodiment, a first inner half-housing 110A is formed by two first engaging plates 111A and two first connecting plates 113A with an inner bottom plate 117. A second inner half-housing 150A is formed by two second engaging plates 151A and two second connecting plates 153A with an inner top plate 157. The first inner half-housing 110A and the second inner half-housing 150A are independently combined to form an inner housing 100A. The inner housing 100A may be made of a ceramic material and is engaged with or glued to the first and second plastic half-housing 10 and 14. Through the inner housing 100A made of the ceramic material surrounding outside of the first segment 211 of the fusible body 21, a temperature-resistant effect of a region where the inner housing 100A is located is further improved.

Figure 9:
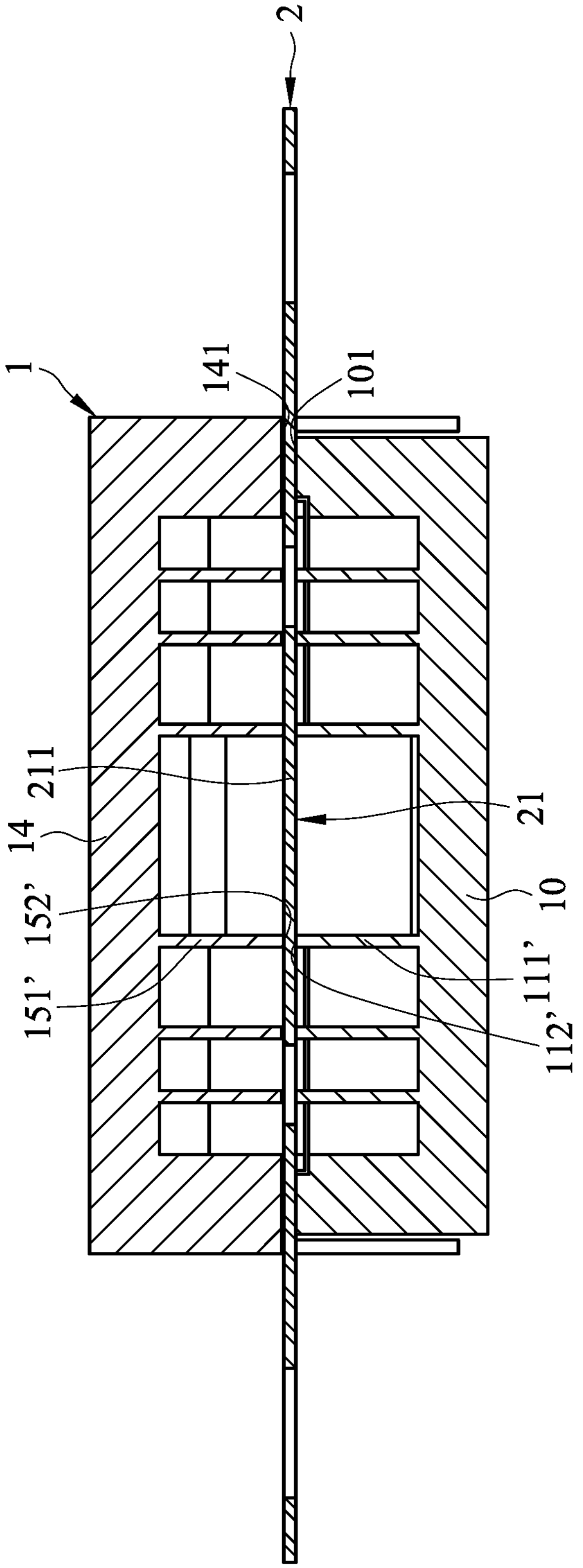
FIG. 9 is a side view in partial section of a fourth embodiment of a lightweight industrial fuse in accordance with the present invention.

With further reference to FIG. 9, another embodiment of a lightweight industrial fuse is shown and similar to the lightweight industrial fuse shown in FIG. 3. In this embodiment, a top surface of each first engaging plate 111 of the first plastic half-housing 10 is flush with a top surface of the first opening 101 of the first plastic half-housing 10. A bottom surface of each second engaging plate 151 is flush with a bottom surface of the second opening 141 of the second plastic half-housing 14. The second engaging plates 151 are respectively aligned with the first engaging plates 111. When the first and second plastic half-housing 10 and 14 are combined, a part of the top surface of each first engaging plates 111 is attached to a part of the bottom surface of the corresponding second engaging plate 151. A first engaging indentation 112' is formed on each first engaging plate 111. A second engaging indentation 152' is formed on each second engaging plate 151. The first segment 211 of the fusible body 21 is also clamped between the first and second engaging plates 111 and 151, located in the fusing cavity 19 as shown in FIG. 3, and is engaged with the first and second engaging indentations 112' and 152'.

Figure 10:
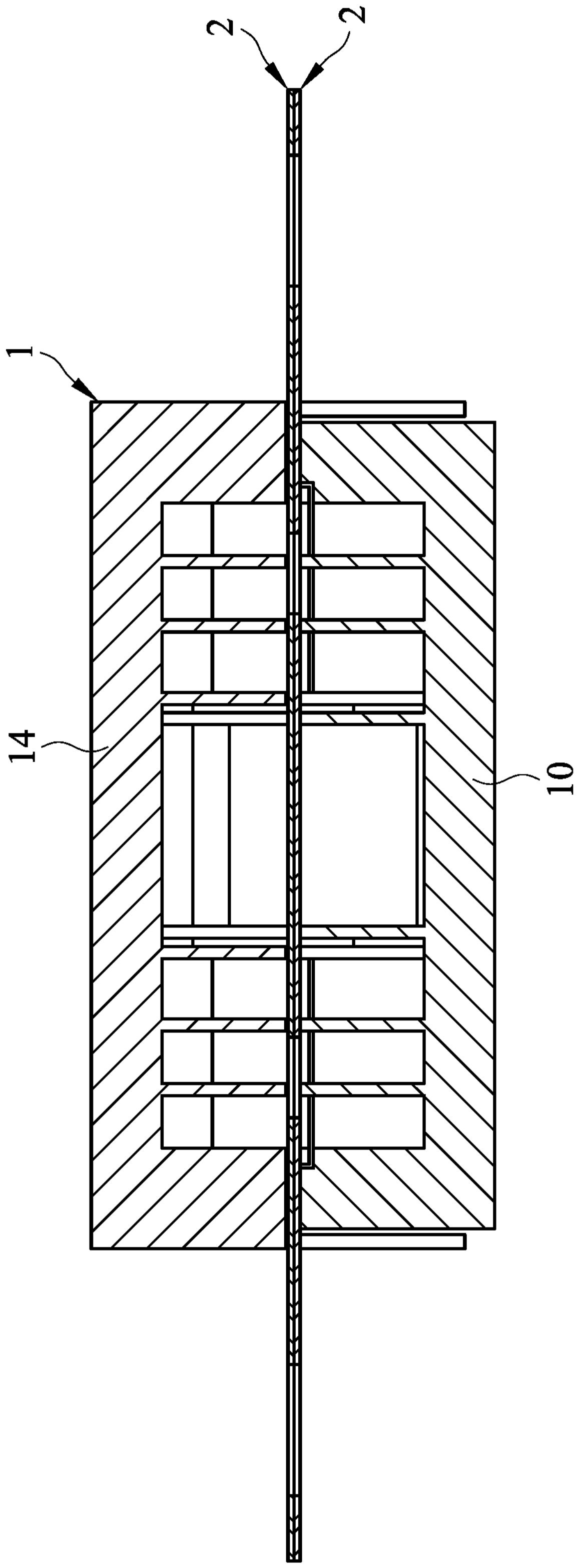
FIG. 10 is a side view in partial section of a fifth embodiment of a lightweight industrial fuse in accordance with the present invention.
Figure 11A:
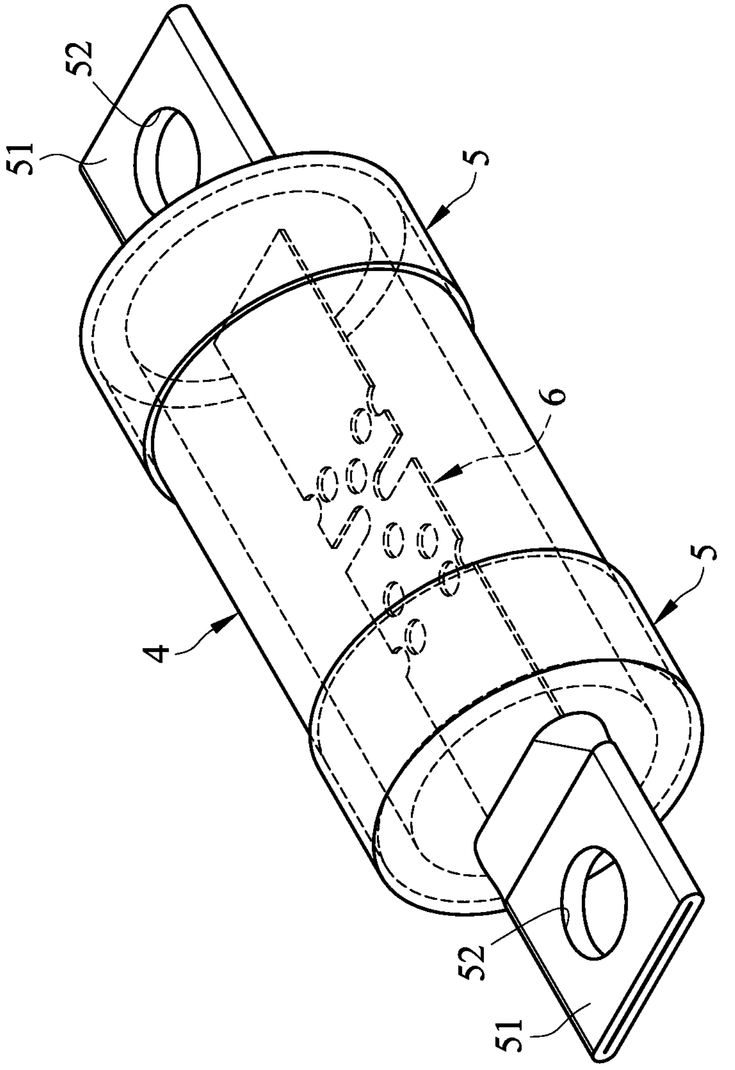
FIG. 11A (PRIOR ART)
FIG. 11A is a perspective view of a conventional industrial fuse in accordance with the prior arts.
Figure 11B:
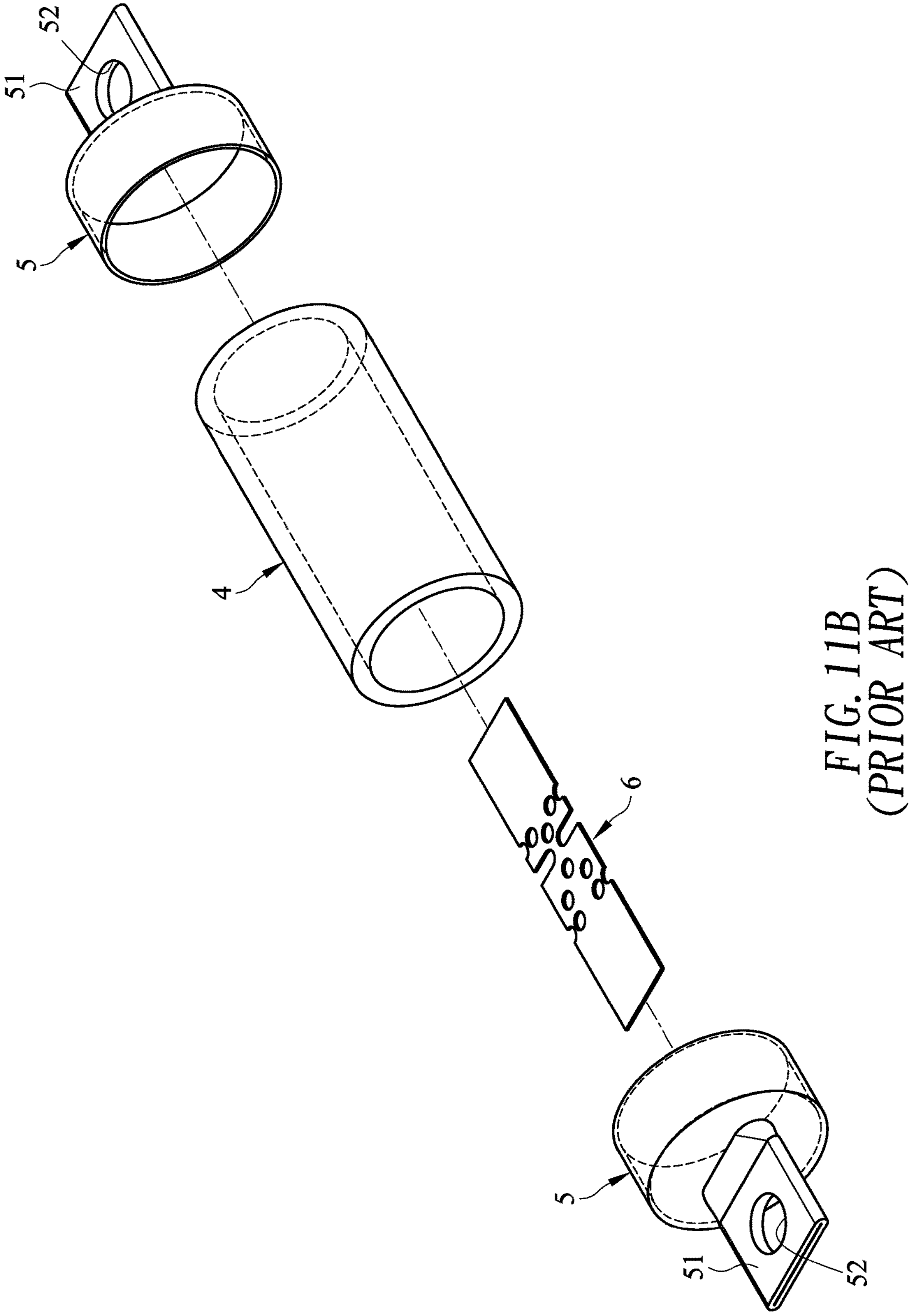
FIG. 11B (PRIOR ART)
FIG. 11B is an exploded perspective view of the conventional industrial fuse in FIG. 11A.

With further reference to FIG. 10, another embodiment of a lightweight industrial fuse is shown and similar to the lightweight industrial fuse as shown in FIG. 3. In this embodiment, the lightweight industrial fuse includes a plurality of sheet conductive fuse 2. The sheet conductive fuses 2 are disposed of overlapping each other and are clamped between the first and second plastic half-housing 10 and 14. The lightweight industrial fuse includes two sheet conductive fuse 2. A thickness of each sheet conductive fuse 2 may be half of a thickness of the sheet conductive fuse 2 of the first embodiment. Similarly, in another embodiment, the lightweight industrial fuse may further include three sheet conductive fuse 2. A thickness of each sheet conductive fuse 2 may be one-third of a thickness of the sheet conductive fuse 2 of the first embodiment. Thus, by adjusting the amount of the sheet conductive fuse 2 to reduce a thickness of each sheet conductive fuse 2, a withstand overcurrent of the conductive fuse 2 is reduced. The lightweight industrial fuse may be applied to a circuit of different lightweight power apparatus or equipment. Furthermore, the housing 1 formed by the combination of the first and second plastic half-housing 10 and 14 does not have to be changed to fit a thinner sheet conductive fuse 2. A production cost of manufacturing the housing 1 matches the sheet conductive fuse 2 with a thinner thickness is saved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An industrial fuse comprising:

a housing having:

a first plastic half-housing having a first half shell and two first sidewalls formed integrally, and a first opening; and a second plastic half-housing combined with the first plastic housing and having a second half shell and two second sidewalls formed integrally, and a second opening, wherein the first and the second openings communicating with each other to define an enclosed accommodation cavity; and at least one sheet conductive fuse clamped between the first and second plastic half-housing, and each of the at least one sheet conductive fuse having a fusible body, two intermediary portions, and two electrode portions formed integrally, wherein the fusible body is disposed in the enclosed accommodation cavity;

the intermediary portions are respectively connected to two opposite ends of the fusible body; and the electrode portions are respectively connected to two ends of the intermediary portions far from the fusible body and respectively expose from two opposite sides of the housing;

wherein the housing further comprising:

two first engaging plates disposed in the first plastic half-housing and integrally formed on an inner surface of the first half shell, and are parallel to the first sidewalls, wherein a top end of each first engaging plate extends out of the first opening of the first plastic half-housing;

a first engaging indentation is formed downward from a top surface of each of the first engaging plates of the first half shell corresponding to the fusible body;

two second engaging plates disposed in the second plastic half-housing and integrally formed on an inner surface of the second half shell, and are parallel to the second sidewalls, wherein a bottom end of each of the second engaging plates extends out of the second opening of the second plastic half-housing, and the first and second engaging plates define a fusing cavity for accommodating a part of the fusible body; and a second engaging indentation is formed upward from a bottom surface of each of the second engaging plates of the second half shell corresponding to the fusible body.

2. An industrial fuse comprising:

a housing having:

a first plastic half-housing having a first half shell and two first sidewalls formed integrally, and a first opening; and a second plastic half-housing combined with the first plastic housing and having a second half shell and two second sidewalls formed integrally, and a second opening, wherein the first and the second openings communicating with each other to define an enclosed accommodation cavity;

at least one sheet conductive fuse clamped between the first and second plastic half-housing, and each of the at least one sheet conductive fuse having a fusible body, two intermediary portions, and two electrode portions formed integrally;

two first engaging plates disposed in the first plastic half-housing and integrally formed on an inner surface of the first half shell, and are parallel to the first sidewalls, wherein a top end of each first engaging plate extends out of the first opening of the first plastic half-housing;

two second engaging plates disposed in the second plastic half-housing and integrally formed on an inner surface of the second half shell, and are parallel to the second sidewalls, wherein a bottom end of each of the second engaging plates extends out of the second opening of the second plastic half-housing, and the first and second engaging plates define a fusing cavity for accommodating a part of the fusible body;

two first connecting plates integrally formed on the inner surface of the first half shell and respectively connected to two opposite sides of the first engaging plates being parallel to and spaced a distance from two opposite sides of the first opening; and two second connecting plates integrally formed on the second half shell and respectively connected to two opposite sides of the second engaging plates and respectively disposed outsides of the first connecting plates, wherein the fusible body is disposed in the enclosed accommodation cavity;

the intermediary portions are respectively connected to two opposite ends of the fusible body; and the electrode portions are respectively connected to two ends of the intermediary portions far from the fusible body and respectively expose from two opposite sides of the housing.

3. The industrial fuse as claimed in claim 2, wherein the second connecting plates are respectively and integrally formed on two opposite sides of the second opening.

4. The industrial fuse as claimed in claim 2, wherein the housing further comprising:

a first inner half-housing disposed in the first plastic half-housing and integrally formed by the two first engaging plates and the two first connecting plates with an inner bottom plate;

a second inner half-housing, wherein the second half-housing is-disposed in the second plastic half-housing and integrally formed by the two second engaging plates and the two second connecting plates with an inner top surface;

the second engaging plates and the second connecting plates disposed outside of the first engaging plates and the first connecting plates; and the first and second inner half-housing formed an inner housing surrounding a part of the fusible body.

5. The industrial fuse as claimed in claim 1, wherein a top surface of the first engaging plates is flush with a top surface of the first opening of the first plastic half-housing;

the two second engaging plates are respectively aligned with the first engaging plates;

a bottom surface of each of the second engaging plates is flush with a bottom surface of the second opening of the second plastic half-housing; and a part of the top surface of each of the first engaging plates is respectively attached to a part of the bottom surface of the corresponding second engaging plate to define the fusing cavity for accommodating the part of the fusible body.

6. An industrial fuse comprising:

a housing having:

a first plastic half-housing having a first half shell and two first sidewalls formed integrally, and a first opening, wherein the first half shell further has:

a plurality of first transverse ribs integrally formed on an inner surface of the first half shell and parallel with the first sidewalls; and a first longitudinal rib integrally formed on the inner surface of the first half shell, protruding through the first transverse ribs, and connecting to the first sidewalls; and a second plastic half-housing combined with the first plastic housing and having a second half shell and two second sidewalls formed integrally, and a second opening, wherein the first and the second openings communicating with each other to define an enclosed accommodation cavity; and the second half shell has a plurality of second transverse ribs integrally formed on an inner surface of the second half shell and parallel with the second sidewalls, wherein a part of each second transverse rib is attached to the corresponding first transverse rib; and a second longitudinal rib integrally formed on the inner surface of the second half shell, protruding through the second transverse ribs, and connecting to the second sidewalls;

at least one sheet conductive fuse clamped between the first and second plastic half-housing, and each of the at least one sheet conductive fuse having a fusible body, two intermediary portions, and two electrode portions formed integrally;

two first engaging plates disposed in the first plastic half-housing and integrally formed on an inner surface of the first half shell, and are parallel to the first sidewalls, wherein a top end of each first engaging plate extends out of the first opening of the first plastic half-housing;

two second engaging plates disposed in the second plastic half-housing and integrally formed on an inner surface of the second half shell, and are parallel to the second sidewalls, wherein a bottom end of each of the second engaging plates extends out of the second opening of the second plastic half-housing, and the first and second engaging plates define a fusing cavity for accommodating a part of the fusible body, wherein the fusible body is disposed in the enclosed accommodation cavity;

the intermediary portions are respectively connected to two opposite ends of the fusible body; and the electrode portions are respectively connected to two ends of the intermediary portions far from the fusible body and respectively expose from two opposite sides of the housing.

7. The industrial fuse as claimed in claim 5, wherein the first half shell further has:

a plurality of first transverse ribs integrally formed on an inner surface of the first half shell and are parallel with the first sidewalls; and a first longitudinal rib integrally formed on the inner surface of the first half shell, protruding through the first transverse ribs, and connecting to the first sidewalls; and the second half shell further has:

a plurality of second transverse ribs integrally formed on an inner surface of the second half shell and parallel with the second sidewalls, wherein a part of each second transverse rib is attached to the corresponding first transverse rib; and a second longitudinal rib integrally formed on the inner surface of the second half shell, protruding through the second transverse ribs, and connecting to the second sidewalls.

8. The industrial fuse as claimed in claim 6, wherein a first notch is formed on each first transverse rib of the first half shell corresponding to the fusible body of the at least one sheet conductive fuse;

a bottom surface of each first notch is flush with a bottom surface of each first engaging indentation;

a second notch is formed on each second transverse rib of the second half shell corresponding to the fusible body of the at least one sheet conductive fuse; and a top surface of each second notch is flush with a top surface of each second engaging indentation.

9. The industrial fuse as claimed in claim 8, wherein a first recess is formed on a plane of each first sidewall of the first plastic half-housing corresponding to each intermediary portion of the at least one sheet conductive fuse;

a bottom surface of each first recess is flush with the bottom surface of each first engaging indentation and the bottom surface of each first notch;

a second recess is formed on a plane of each second sidewall of the second plastic half-housing corresponding to each intermediary portion of the at least one sheet conductive fuse; and a top surface of each second recess is flush with the top surface of each second engaging indentation and the top surface of each second notch.

10. The industrial fuse as claimed in claim 9, wherein two fixing posts are integrally formed on the plane of each first sidewall and are located at two opposite sides of the corresponding first recess;

each fixing post is higher than the first engaging plates;

two fixing holes are formed through the plane of each second sidewall for the corresponding fixing post disposed through; and an end of each fixing post is welded to the corresponding fixing hole.

11. The industrial fuse as claimed in claim 8, wherein two matching portions are integrally formed on the plane of each second sidewall and are disposed outsides of the first sidewalls.

12. The industrial fuse as claimed in claim 9, wherein an annular groove is further formed on an inner periphery of the first opening of the first plastic half-shell;

two opposite engaging flanges are further formed on an inner periphery of the second opening of the second plastic half-shell; and the engaging flanges are engaged with and attached to the annular groove.

13. The industrial fuse as claimed in claim 10, wherein the fusible body of the at least one sheet conductive fuse further has:

a first segment having a linear shape, clamped between the first and second engaging plates, located at the fusing cavity, and engaged with the first and second engaging indentations; and two second segments extending from two ends of the first segment and connected to the corresponding intermediary portion, wherein the second segments are respectively clamped between the corresponding first and second transverse ribs; and the second segments are located at the enclosed accommodation cavity and are respectively engaged with the corresponding first and second notches.

14. The industrial fuse as claimed in claim 13, wherein a gap is formed through each second segment of the fusible body;

a plurality of notch is formed through the intermediary portions corresponding to the fixing posts;

each notch is engaged with the corresponding fixing post;

a width of each of the intermediary portions is larger than a width of the first segment of the fusible body; and a hole is formed through each of the electrode portions.

15. The industrial fuse as claimed in claim 1, wherein the at least one sheet conductive fuse includes multiple sheet conductive fuses overlapping each other and clamped between the first and second plastic half-housing.

16. The industrial fuse as claimed in claim 2, wherein an explosion-proof material is filled in the fusing cavity.

* * * * *